(12) United States Patent
Rameau et al.

(10) Patent No.: US 8,061,494 B2
(45) Date of Patent: Nov. 22, 2011

(54) INSULATING SUPPORT FOR ELECTRICAL POWER SUPPLY TRACKS

(75) Inventors: Cyril Rameau, Paris (FR); Julien Gellee, Dubai (AE); Guillaume Baudienville, Puteaux (FR)

(73) Assignee: Alstom Transport SA, Levallois-Perret (FR)

( * ) Notice: Subject to any disclaimer, the term of this patent is extended or adjusted under 35 U.S.C. 154(b) by 107 days.

(21) Appl. No.: 12/624,021

(22) Filed: Nov. 23, 2009

(65) Prior Publication Data
US 2010/0175961 A1 Jul. 15, 2010

(30) Foreign Application Priority Data
Nov. 21, 2008 (FR) ..................................... 08 57919

(51) Int. Cl.
*A63H 19/30* (2006.01)
(52) U.S. Cl. .................. 191/29 R; 191/22 DM; 191/32; 191/23 R; 104/124
(58) Field of Classification Search ................ 191/29 R, 191/30–32, 23 R, 24–26, 28, 23 A, 22 C
See application file for complete search history.

(56) References Cited

U.S. PATENT DOCUMENTS

| | | | | |
|---|---|---|---|---|
| 2,254,147 A | * | 8/1941 | Horn ............................. | 191/23 A |
| 2,835,752 A | * | 5/1958 | Anjeskey et al. ........... | 191/23 R |
| 2,903,526 A | * | 9/1959 | Mattox, Sr. ..................... | 191/49 |
| 3,037,095 A | * | 5/1962 | Reiterer et al. ............. | 191/22 R |
| 3,673,966 A | * | 7/1972 | Wilson ........................... | 104/288 |
| 3,709,337 A | * | 1/1973 | Payen .......................... | 191/22 R |
| 3,790,725 A | * | 2/1974 | Charamel et al. ............ | 191/29 R |
| 4,067,257 A | * | 1/1978 | Pentith ........................... | 104/140 |
| 4,238,010 A | | 12/1980 | Hidaka | |
| 4,239,094 A | | 12/1980 | Uchiyama et al. | |
| 4,274,336 A | * | 6/1981 | Pater et al. ..................... | 104/124 |
| 4,313,383 A | * | 2/1982 | Parazader ..................... | 104/124 |
| 4,375,193 A | * | 3/1983 | Sullivan ........................ | 104/118 |
| 4,776,282 A | * | 10/1988 | Ishikura et al. ................ | 104/109 |
| 5,566,620 A | * | 10/1996 | Siewert .......................... | 104/124 |
| 5,823,114 A | * | 10/1998 | Cioletti et al. ................ | 104/124 |
| 5,960,717 A | | 10/1999 | Andre | |
| 6,250,442 B1 | * | 6/2001 | Perraud et al. ..................... | 191/6 |
| 6,324,989 B1 | * | 12/2001 | Taylor et al. ..................... | 104/93 |

(Continued)

FOREIGN PATENT DOCUMENTS
DE 2455708 5/1976
(Continued)

*Primary Examiner* — Joe Morano, IV
*Assistant Examiner* — Jason C Smith
(74) *Attorney, Agent, or Firm* — Davidson, Davidson & Kappel, LLC

(57) ABSTRACT

An insulating support for a ground electrical power supply track is provided. The insulating support is intended for a terrestrial transport system, in particular of the tramway type, and is in the form of a profile-member of insulating material which includes a substantially planar upper face intended to receive elements of the electrical power supply track and a planar lower face intended to be supported directly or indirectly on the ground. The profile-member is provided with a longitudinal groove is arranged on the upper face in order to receive a conductive track element. The profile member is also provided with a web which connects the upper face to the lower face. At least one longitudinal supply conduit intended to receive a supply line of the network extends through the web. The groove and each supply conduit are arranged centrally and symmetrically about a longitudinal center plane of the support perpendicular relative to the upper face.

20 Claims, 6 Drawing Sheets

U.S. PATENT DOCUMENTS

| | | | |
|---|---|---|---|
| 6,520,303 B1 * | 2/2003 | Malek et al. | 191/22 R |
| 6,672,441 B1 * | 1/2004 | Uremovic | 191/32 |
| 6,782,832 B2 * | 8/2004 | Reichel et al. | 104/124 |
| 7,748,509 B2 * | 7/2010 | Donnard | 191/25 |
| 7,926,634 B1 * | 4/2011 | Morales | 191/29 R |
| 2008/0105509 A1 * | 5/2008 | Donnard | 191/23 R |
| 2010/0175961 A1 * | 7/2010 | Rameau et al. | 191/22 DM |

FOREIGN PATENT DOCUMENTS

| | | |
|---|---|---|
| EP | 1043186 A1 * | 10/2000 |
| FR | 2735728 | 12/1996 |
| WO | 2008138401 A1 | 11/2008 |

* cited by examiner

INSULATING SUPPORT FOR ELECTRICAL POWER SUPPLY TRACKS

This claims priority to FR 08 57919 filed Nov. 21, 2008 and hereby incorporated by reference herein.

The invention relates to an insulating support for supply tracks which is intended for a terrestrial transport system of the tramway type, and a method for producing an insulating support.

BACKGROUND

There are ground-based electrical power supply systems which allow vehicles of the tramway type to capture, via a friction shoe, the electrical traction energy required to move them and unattractive aerial lines to be dispensed with, in particular in the region of junctions.

Such a system is described in the patent application EP 1 043 186 A 1. The system described involves a ground-based electrical power supply assembly which comprises a series of segments of conductive contact tracks which are mutually isolated and at least partially exposed, an electrical line which is intended to be permanently supplied with electrical power, means which are capable of selectively connecting the track segments to the electrical line and track supports of an insulating material which each have a cross-section which is generally "I"-shaped.

On the upper portion of the supports, there are provided two parallel grooves, which are arranged in a symmetrical manner about a longitudinal center plane which is perpendicular relative to the extension plane of the upper portion, and which are capable of receiving an alternating sequence of conducting and insulating elements in the form of bars.

In the web of the profile-member of the supports, there are arranged four internal rectangular passages which are capable of receiving metal bars of a high-voltage electrical line. The passages are arranged in pairs at one side and the other of a longitudinal center plane which is orthogonal relative to the upper surface which separates the profile-member of the support into two, in an offset manner at each side.

At one side and the other of the longitudinal center plane there is engraved a detection notch, the two notches forming a pair which is intended to receive cables of a detection loop of a nearby magnetic field.

With this system, the communication signal supported by a magnetic field of the detection loop is interfered by spurious signals which are produced inside the two bars.

The technical problem addressed is to reduce the intensity of the spurious signals which interfere the communication signal supported by the magnetic field of the detection loop.

SUMMARY OF THE INVENTION

The present invention provides an insulating support for a ground-based electrical power supply track which is intended for a terrestrial transport system, in particular of the tramway type, in the form of a profile-member of insulating material which comprises a substantially planar upper face which is intended to receive elements of the electrical power supply track and a planar lower face which is intended to be supported on the ground, the profile-member being provided with a longitudinal groove which is arranged in the upper face in order to receive a conductive track element, and being provided with a web which connects the upper face to the lower face and through which at least one longitudinal electrical power supply conduit which is intended to receive an electrical power supply line of the high-voltage network extends, characterized in that there is only one groove, and the groove and each electrical power supply conduit are arranged centrally and symmetrically about a longitudinal center plane of the support perpendicular relative to the upper face.

According to specific embodiments, the insulating support may include one or more of the following features:

the width of the groove is at least 10 cm;

the groove comprises a base, the cross-section of the longitudinal edges of which is of dovetail-like shape;

the insulating upper face, at each side in the direction of the width, protrudes beyond a longitudinal edge of the groove by a distance greater than or equal to 45 mm;

the support comprising at least one track fixing cell which is located below the central groove, the fixing cell being provided with a fixing means;

a fixing cell is an electrical power supply conduit;

the support comprises two longitudinal lateral flanges which are located at each side of the groove, a magnetic detection loop cable conduit which is located at a distance of at least 85 mm relative to the center plane extending through each flange;

each flange comprises a weight-reduction cell which is located at the same level as the fixing cells;

the support comprises a pair of external walls and at least one pair of internal walls which are inclined and parallel relative to the center plane, respectively, the two walls of each pair being symmetrical relative to the center plane and connecting the upper face to the lower face;

the support comprises a single pair of internal walls which connect the upper face to the lower face;

the support is integral;

the support comprises three separate elementary profile-members which correspond to three portions, respectively, a first portion comprising a first external wall and a first half of a first internal wall, a second central portion comprising a second half of the first internal wall and a first half of a second internal wall, a third portion comprising a second half of the second internal wall and a second external wall, and the three elementary profile-members are fixed together side by side by a fixing means, in particular adhesive;

the three separate elementary profile-members each have a radius of curvature which increases from the elementary profile-member located closest to a center of curvature as far as the elementary profile-member which is located furthest from the center of the radius of curvature;

the support comprises two separate elementary profile-members which are assembled and fixed together and a longitudinal insert, through which the at least one central conduit extends, clamped between the two elementary profile-members extends; and the insulating material is a composite material of pultruded glass fibers.

The invention also provides an assembly of insulating supports as defined above, characterized in that it comprises a fishplate for connecting the two insulating supports, the fishplate comprising two lateral flanges which extend longitudinally, and a cover with two lateral flanges which extend longitudinally and which have a predetermined thickness, and in that each lateral flange comprises an inner face which corresponds, at both longitudinal ends thereof, to the outer shape of the two external walls located at the same side of the two supports.

According to specific embodiments, the assembly may include one or more of the following features:

the thickness of the cover is slightly greater than the depth of the groove, and the lateral flanges each comprise a support rib of the cover arranged on the associated inner face so as to each be located at the same level as the base of the groove when the lateral flanges are assembled with the external walls of the two insulating supports; and the assembly comprises means for clamping the lateral flanges around the insulating supports.

The invention further provides a method for producing an insulating support for a ground-based electrical power supply track which is intended for a terrestrial transport system, in particular of the tramway type, comprising the steps involving:

drawing, by means of glass fiber pultrusion, at least two elementary profile-members over a predetermined length, each elementary profile-member corresponding to a longitudinal portion of a support profile-member of insulating material, the support profile-member comprising a substantially planar upper face which is intended to receive elements of the electrical power supply track and a planar lower face which is intended to be supported on the ground, the profile-member being provided with a longitudinal central groove which is arranged on the upper face in order to receive a conductive track element, and being provided with a web which connects the upper face to the lower face and through which at least one longitudinal conduit extends which is intended to receive an electrical power supply line of the high-voltage network, there being only one groove, the groove and each supply conduit being arranged in a symmetrical manner about a longitudinal center plane which is perpendicular relative to the upper face, arranging the elementary profile-members side by side, adhesively-bonding longitudinal surfaces of each corresponding elementary profile-member when placed in contact with the portions, bending, with the elementary profile-members being assembled, by means of pretensioning over a preforming die in accordance with a radius of curvature which is centered about a predetermined mean value, the radius of curvature varying increasingly in accordance with the position of the elementary profile-member relative to a center of curvature, adhesively-bonding the elementary profile-members, clamping them using tie-rods, taking the two ends of the insulating support and placing the ends of each elementary profile-member at the same level, and clamping the elementary profile-members using tie-rods which form safety elements in the event that the elementary profile-members become separated.

BRIEF DESCRIPTION OF THE DRAWINGS

The invention will be better understood from a reading of the following description of a single embodiment given purely by way of example and with reference to the drawings, in which.

DETAILED DESCRIPTION

Figure 1:
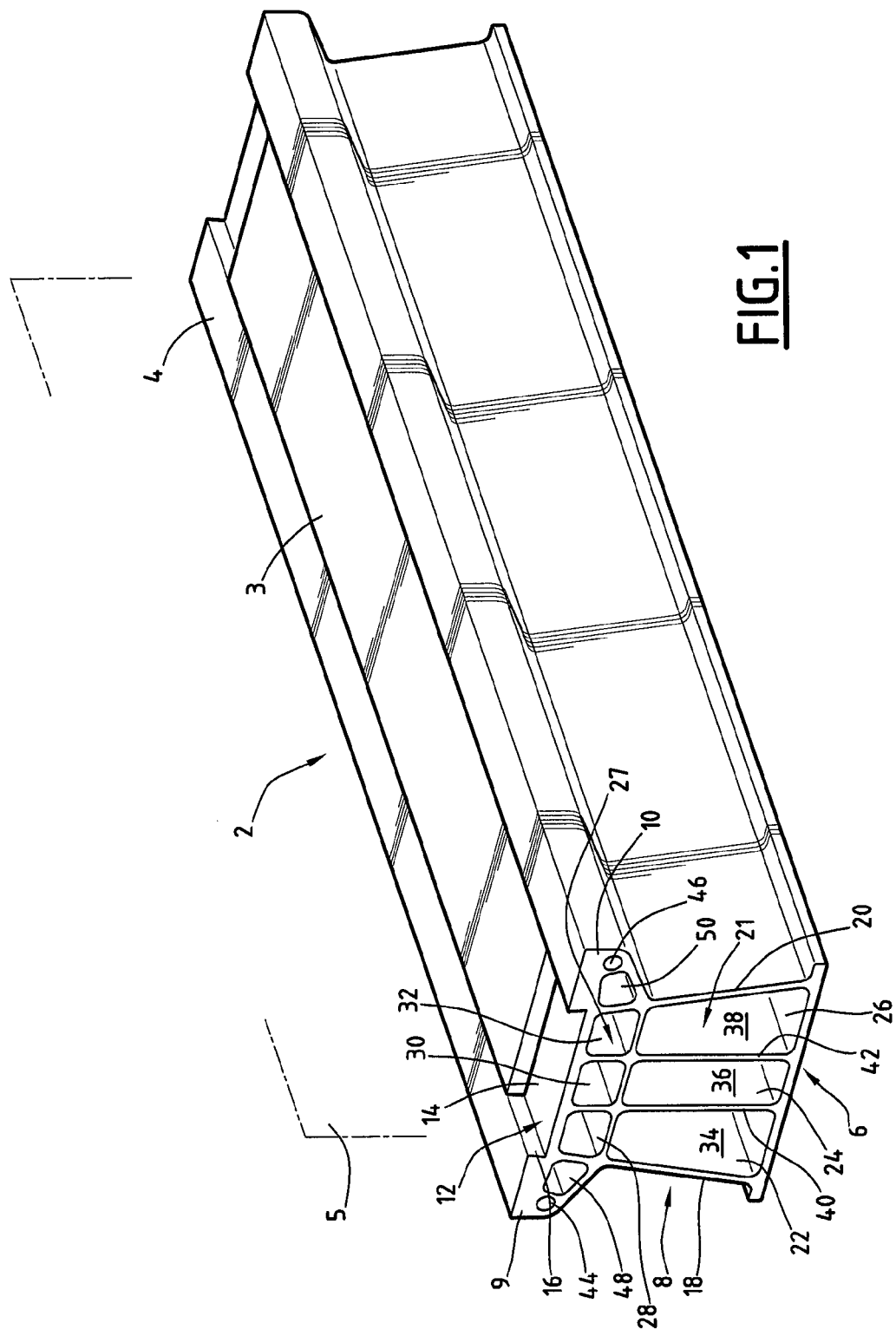
FIG. 1 is a perspective view of a portion of the insulating support provided with a conductive electrical power supply track.
Figure 2:
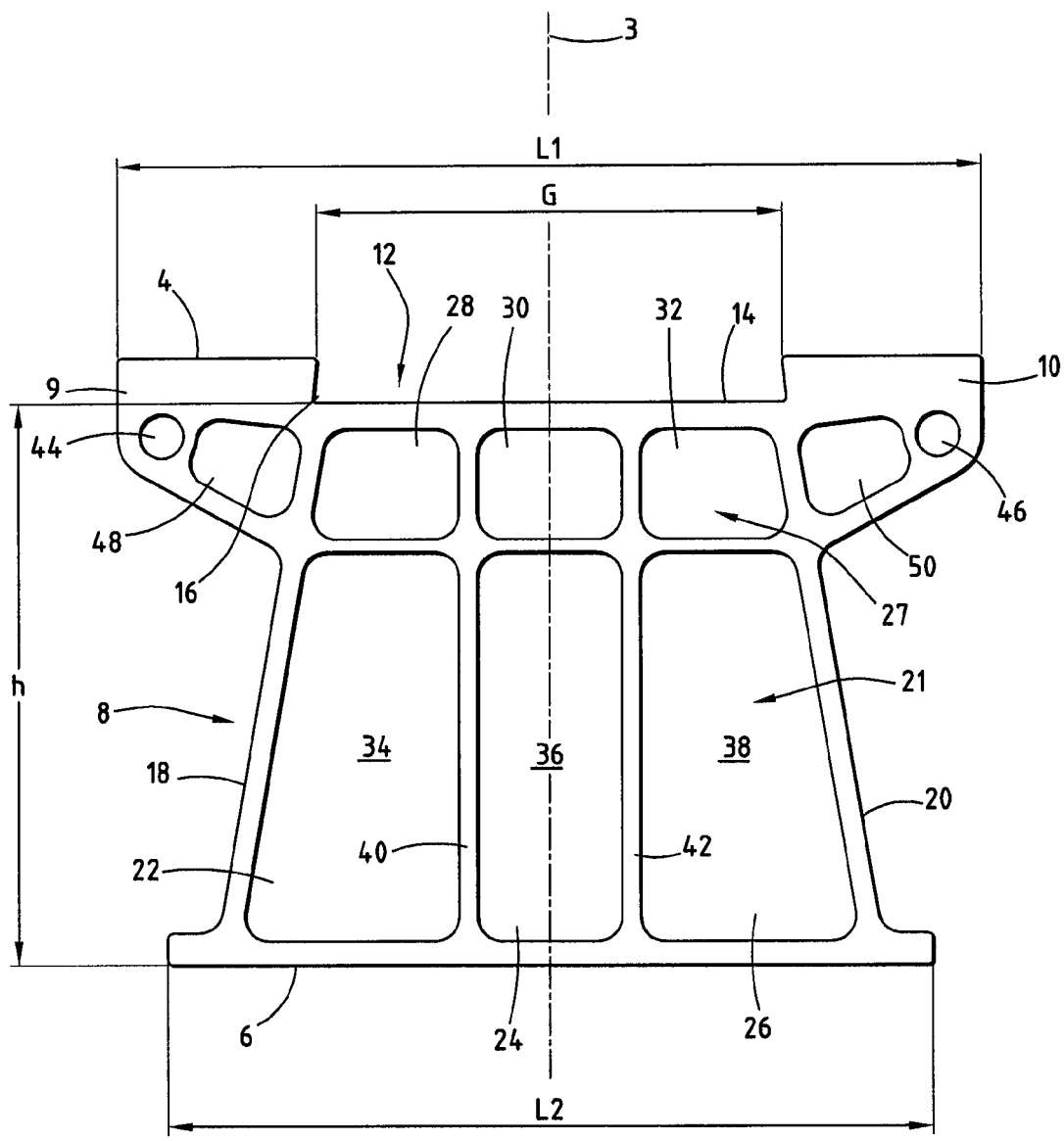
FIG. 2 is a front view of the insulating support portion of FIG. 1.

FIGS. 1 and 2 illustrate an insulating support portion 2, which is in this instance rectilinear and which is intended to receive, where appropriate, a conducting supply track element, an insulating element or a succession of conducting and insulating track elements.

The insulating support portion 2 is in the form of a rectilinear profile-member which has a cross-section which is contained in a trapezoidal template and which has a maximum length of 18 meters.

In this instance, the support portion 2 is integral, being constituted in one piece from a homogeneous material.

The insulating support portion 2 comprises a substantially planar upper face 4 which is intended to receive one or more electrical power supply track elements 3 and, arranged in parallel relative to the upper face 4, a planar lower face 6 which is intended to face the ground and is placed thereon either directly or indirectly via positioning plates.

The profile-member has a longitudinal center plane 5 of symmetry which is perpendicular relative to the upper face 4 and which divides the profile-member of the support 2 into two symmetrical portions.

The insulating support portion also comprises a web 8 which connects the upper face 4 and the lower face 6 and, arranged at each side of the web, directly below the upper face 4, two lateral flanges 9, 10 which extend longitudinally.

The upper face 4 and the lower face 6 have a width L1 and L2, respectively.

The upper face 4 of the insulating support 2 is provided with a hollow recess 12 centrally over the entire length thereof, forming a central groove having a predetermined depth which is intended to receive a track element 3.

The central groove 12 has a width G such that the ratio of the width G to the width L2 is between 0.7 and 1 which ensures stability of the profile-member 2 when a tramway collector shoe moves into abutment against the inner side of the groove 12.

The groove 12 is remote from the lower face 6 by a height h, the ratio of the width L2 of the lower face 6 to the height h being less than 2 and ensuring good resistance to the tilting of the profile-member 2 which forms a beam in the case of a differential of forces applied to the groove 12 about the axis formed by the intersecting straight line of the extension plane of the groove 12 and the center plane 5 perpendicular relative to the upper face 4.

The width G of the groove 12 is at least 10 cm and the groove 12 comprises a base 14, the cross-section of the longitudinal edges 16 of which being of dovetail-like shape.

The web 8 has the outer shape of an ingot having a trapezoidal cross-section which is delimited by a base which is constituted by the lower face 6, a face opposite to the base constituted by the base 14 of the groove 12 and, at each side symmetrically relative to the center plane 5, two lateral walls 18, 20 which are at least partially external.

The web 8 is perforated in the region of a first cell stage 21 from the lower face 6 by a first row of three longitudinal cells 22, 24, 26 which form three conduits which are intended to receive electrical cables.

The conduits 22, 24, 26 are arranged in a symmetrical manner relative to the center plane 5 and the center plane passes through the central conduit 24.

The central conduit 24 is intended to receive the electrical power supply cable which is capable of transporting large electrical currents under high-voltage, for example, 750 volt for a tramway application.

The lateral conduits 22 and 26 are intended to receive connectors and low-voltage cables, that is to say, voltages which are substantially lower than the high voltage of the electrical power supply cable, for example, 220 volt for a tramway application, and to convey weak currents.

The web 8 is also perforated in the region of a second cell stage 27 which is superimposed on the first cell stage 22, 24, 26 and below the central groove 12 of a second row of three longitudinal track fixing cells 28, 30, 32 which allow access to a fixing device, for example, of the screw/nut type and which are integrated in or on the cells 28, 30, 32 and which are capable of fixing a track element 3 to the base 14 of the groove 12.

The fixing cells 28, 30, 32 are arranged in a symmetrical manner relative to the center plane 5 and the center plane 5 extends centrally through the cell 30.

The central fixing cell 30 is also capable of receiving an electrical power supply cable of the high-voltage electrical network and acting as a supply conduit in the same manner as the central supply conduit 24 of the first cell stage 21.

Only the central fixing cell 30 and the central electrical power supply conduit are capable of receiving one or more track supply cables.

The cells 22, 24, 26, 28, 30, 32 are thus distributed in three portions 34, 36, 38, a first portion 34 containing the cells 22, 28, a second central portion 36 containing the cells 24, 30 and a third portion 38 containing the cells 26, 32.

The first portion 34 is delimited by the external wall 18 which is inclined relative to the center plane 5 and a first half of a first internal wall 40 which is parallel with the center plane 5.

The second central portion 36 is delimited by the second half of the first internal wall 36 and a first half of a second internal wall 42 parallel with the center plane 5.

The third portion 38 is delimited by the second half of the second internal wall 42 and the external wall 20 which are parallel and inclined relative to the center plane 5, respectively.

The external and internal walls 18, 20, 40, 42 connect the upper face 4 to the lower face 6.

The two longitudinal lateral flanges 9, 10 are located at each side of the groove 12 and each flange 9, 10 is perforated by a magnetic detection loop cable conduit 44, 46 which is located at a distance of, for example, at least 45 mm from the closest edge of the groove 12 or, for example, 85 mm from the center plane 5.

Each flange 9, 10 comprises a weight-reduction cell 48, 50 which is located at the same level as the fixing cells 28, 30, 32.

In another preferred embodiment, the number of internal walls is at least equal to three and two of the internal walls delimit central cells which are symmetrical relative to the center plane 5.

Figure 3:
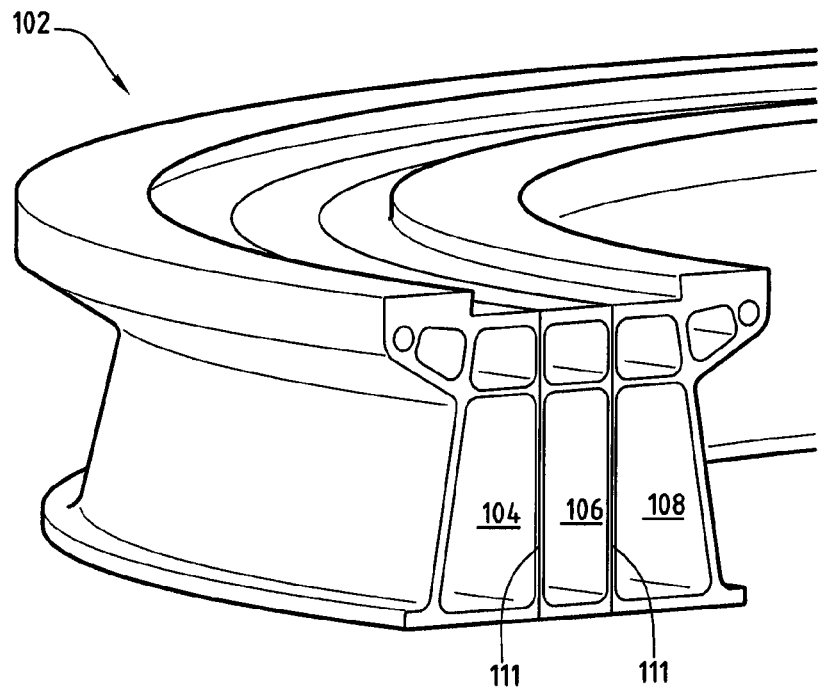
FIG. 3 is a perspective view of a first variant of a curved portion of the insulating support of FIG. 1.

According to FIG. 3, the insulating portion support 102 is the support 2 shown in FIG. 1 with a longitudinal curved shape and the same profile-member cross-section.

The support 102 comprises three separate elementary profile-members 104, 106, 108 which are assembled and fixed together by a fixing device, for example, adhesive joints 111.

The elementary profile-members 104, 106 and 108 correspond to the portions 34, 36, 38 of FIG. 1, respectively, of which the internal walls 40 and 42 have been cut into two portions of equal thickness.

In practice, the elementary profile-members 104, 106 and 108 are produced separately by a profile-member drawing device.

Each elementary profile-member corresponding to a portion is constituted by a composite material of glass fibers which is obtained by pultrusion.

Figure 4:
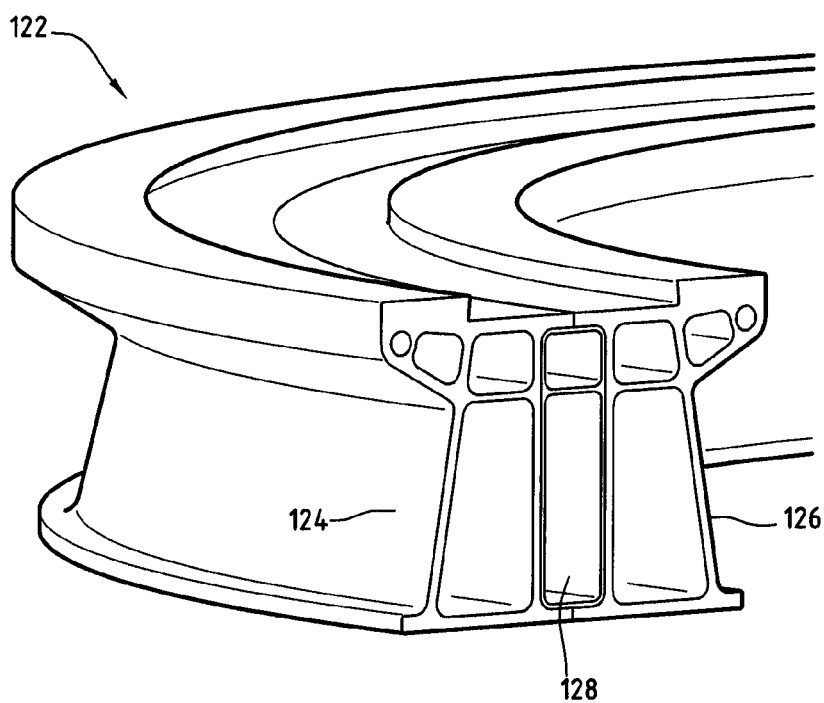
FIG. 4 is a perspective view of a second variant of a curved portion of the insulating support of FIG. 1.

According to FIG. 4, the insulating portion support 122 is the support 2 shown in FIG. 1 with a curved longitudinal shape and the same profile-member cross-section.

The support 122 comprises two separate elementary profile-members 124, 126 which are assembled and fixed together by adhesive joints 127, and an insert 128 which is clamped between the two elementary profile-members.

The two elementary profile-members 124 and 128 generally correspond to the portions 34 and 38 of FIG. 1, respectively, while the insert 126 generally corresponds to the portion 36.

The two elementary profile-members 124 and 128 correspond to the insulating support of FIG. 1 which is cut into two along the longitudinal center plane 5, in which the walls which are parallel with the upper surface 4 and which protrude from the internal walls towards the plane 5 have been removed.

In practice, the two elementary profile-members 124 and 128 are produced separately by a profile-member drawing device.

The two profile-members 124 and 128 are constituted by a composite material of glass fibers which is obtained by pultrusion.

The insert 126 is constituted by a different flexible material in order to allow the curvature.

Figure 5:
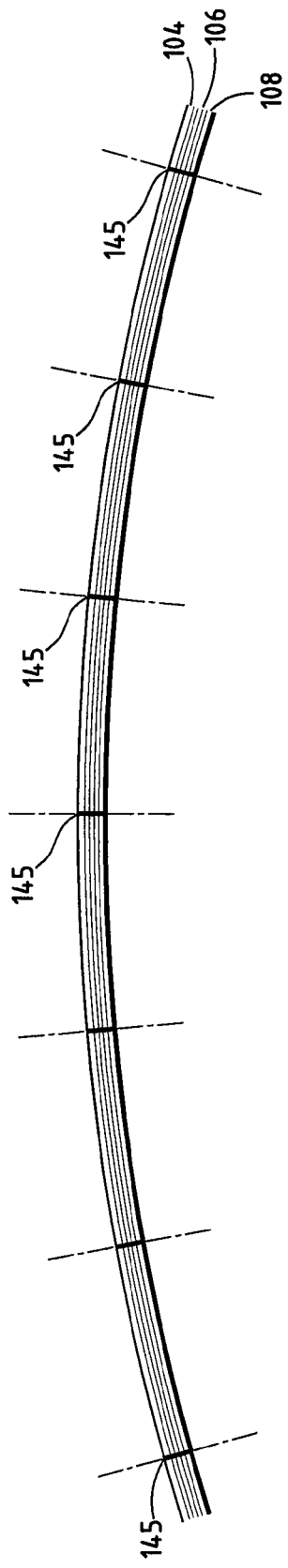
FIG. 5 is a plan view of the curved portion of FIG. 3.

According to FIG. 5, the curved portion support 102 of FIG. 3 has a mean radius of curvature which is assigned to the elementary profile-member 106 while a lower or upper radius of curvature is assigned to the elementary profile-member 108 or the elementary profile-member 104, respectively.

The curved support portion 102 is perforated regularly in accordance with the length of conduit holes 145 which are located below the flanges 9, 10 and which extend from one side to the other of the conduit cells 22, 24, 26.

The conduit holes 145 are intended to receive elements for fixing to a preforming die during the curving and adhesive-bonding of the elementary profile-members and to receive, after the profile-members have been adhesively-bonded, tie-rods for holding the pretensioned beam 102 in position.

Figure 6:
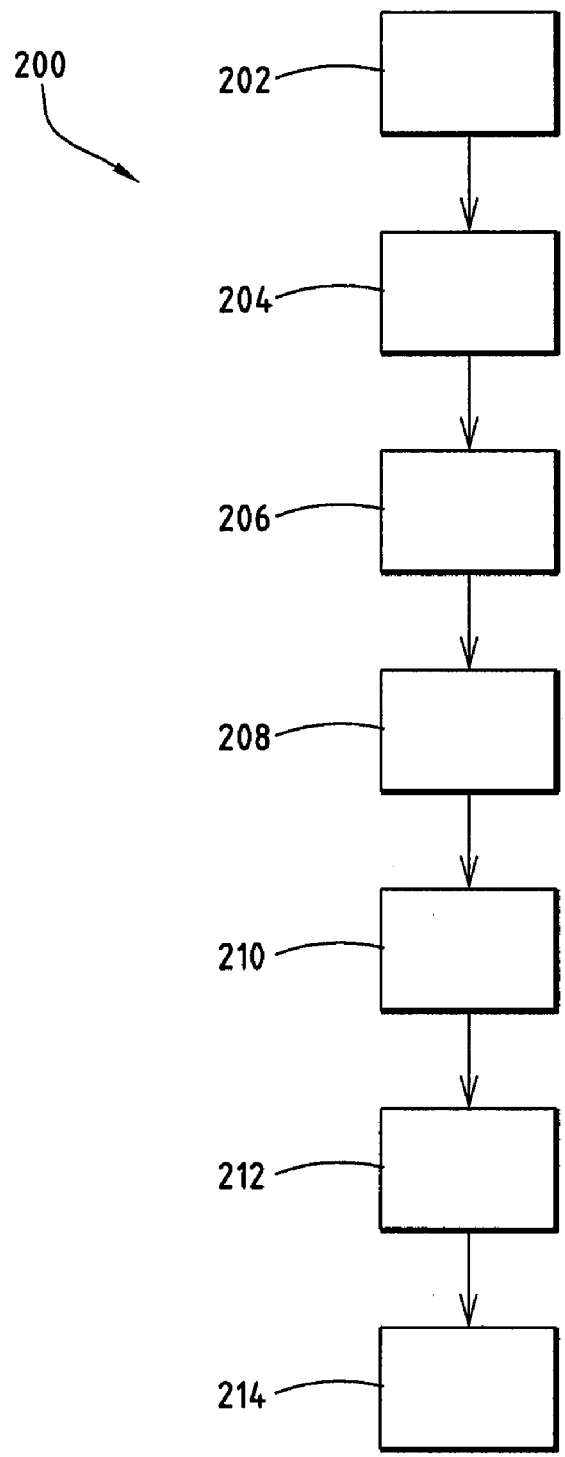
FIG. 6 is a flow chart of a production method of the curved portion of FIGS. 3 and 4.

According to FIG. 6, a method 200 for producing a curved insulating support for an electrical power supply track 102, the support 102 having the shape described in FIG. 3, comprises a set of successive steps.

In a first step 202, a drawing device draws, by pultrusion of glass fibers, three elementary profile-members 104, 106, 108 over a predetermined length, each elementary profile-member corresponding to a longitudinal portion 34, 36, 38 described in FIGS. 1, 2.

In a following step 204, the elementary profile-members 104, 106, 108 are arranged side by side in the direction of the length so as to be able to achieve the shape of the support 102.

Then, in a step 206, the longitudinal surfaces of each elementary profile-member which are intended to be in contact are adhesively-bonded. In this manner, the two halves of the first internal wall arranged facing each other are adhesively-bonded. In the same manner, the two halves of the second internal wall arranged facing each other are adhesively-bonded.

Then, in a step 208, the elementary profile-members 104, 106, 108 are bent by pretensioning over a preforming die in accordance with a radius of curvature which is centered about a predetermined mean value, the radius of curvature varying increasingly in accordance with the position of the elementary profile-member relative to a center of curvature.

According to FIG. 5, a mean radius of curvature is assigned to the elementary profile-member 106 while a lower or upper radius of curvature is assigned to the elementary profile-member 108 or to the elementary profile-member 104, respectively.

In a step 210, the elementary profile-members 104, 106, 108 are clamped to the preforming die using tie-rods and are adhesively-bonded.

Then, in a step 212, the two ends of the insulating support are taken up and the ends of each elementary profile-member are placed at the same level.

Then, in a step 214, the die is disassembled and the tie-rods are tightened on the insulating support, thus forming safety elements in the event of separation.

Figure 7:
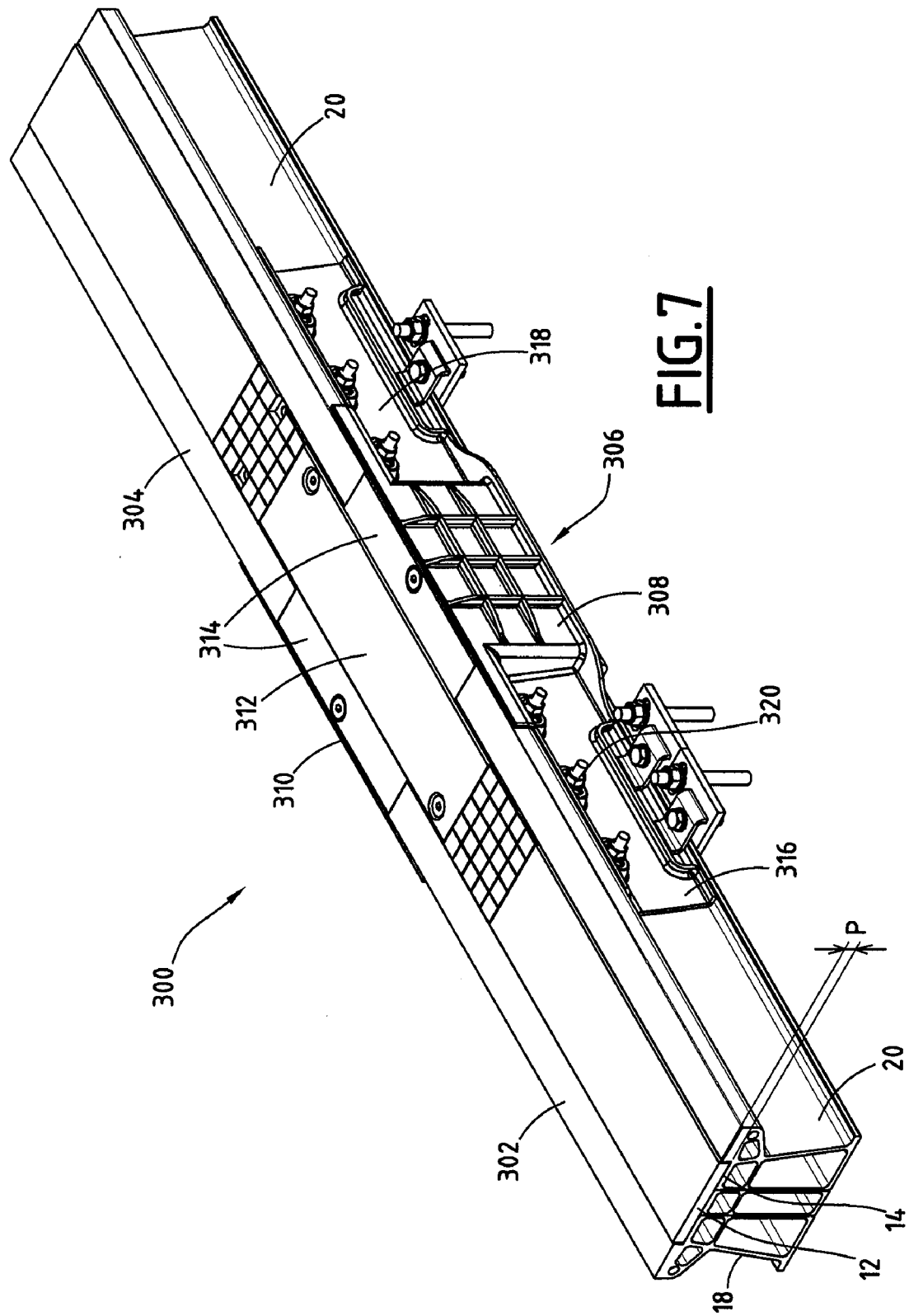
FIG. 7 is a perspective view of an assembly of two insulating supports of the type described in FIG. 1, connected by means of a fishplate.

FIG. 7 illustrates the assembly of two insulating supports 302, 304 of the type described in FIG. 1, which are connected by a fishplate 306.

The fishplate 306 comprises two lateral flanges 308, 310 which extend longitudinally and a cover 312 with two lateral flanges 314 which extend longitudinally and which have a predetermined thickness.

Each lateral flange 308, 310 comprises an inner face which corresponds, at the two longitudinal ends 316, 318 thereof, to the outer shape of the two respective external walls of the two supports 302, 304 which are located at the same side, that is to say, the external walls 20 for the lateral flange 308, and the external walls 18 for the lateral flange 310.

The thickness of the cover 312 is slightly greater than the depth P of the groove 12 and is equal to the thickness of an electrical power supply track.

The lateral flanges 308, 310 each comprise a cover support rib.

The ribs are arranged on the associated inner face of each flange so as to each located at the same level as the base 14 of the groove 12 when the lateral flanges 308, 310 are assembled with the associated lateral walls 20, 18 of the two insulating supports 302, 304.

The flanges 308, 310 are clamped around the insulating supports 302, 304 by a clamping device, for example, bolts, one of which is generally designated 320.

In this manner, the fishplate 306 allows the connection of the two insulating supports 302, 304 and the passage of a tramway collector shoe without a hitch.

The central arrangement around the center plane 5 of the single groove 12 and the supply conduits prevents creation of loops of spurious currents between the conductors arranged in the groove 12 and the supply conduits 24, 30, with the loops of spurious currents created being located in a plane parallel with the extension plane of the magnetic field detection loop formed by the conductors which are accommodated in the two magnetic detection loop cable conduits 44, 46.

The large width of the single central groove G prevents a blockage of the collector shoe having a smaller width, in particular on bends.

At each side, the protrusion by the insulating upper face 4 beyond the groove by a distance greater than, for example, 45 mm relative to an edge of the groove 12 prevents occurrences of electrical arcing between an element of the conductive track 3 and the external metal environment with respect to the insulating support 2.

The lateral displacement at the respective sides of the two magnetic loop detection cable conduits 44, 46 by a distance at least equal to 35 mm, for example, relative to an edge of the groove 12 prevents the positioning of the collector shoe above a cable of the magnetic detection loop.

This lateral displacement also allows absorption of the magnetic field created by the magnetic detection loop by an element of the conductive track 3 to be prevented and prevents excessive masking with respect to a communication antenna on board of a tramway.

The dovetail shape of the cross-section of the edges facilitates the assembly and disassembly of the track elements 3 for which very precise machining is not required.

What is claimed is:

1. An insulating support for a ground-based electrical power supply track for a ground transport system in the form of a profile-member of insulating material comprising: a planar upper face receiving a conductive track element of the electrical power supply track; a planar lower face supported on the ground; a single longitudinal groove arranged in the planar upper face in order to receive the conductive track element; a web connecting the upper face to the lower face; and one longitudinal supply conduit for receiving an electrical power supply line of the high-voltage network extending through the web; the single longitudinal groove and the one supply conduit being arranged centrally and symmetrically about a longitudinal center plane of the support perpendicular relative to the upper face.

2. The insulating support according to claim 1, wherein a width of the single longitudinal groove is at least 10 cm.

3. The insulating support according to claim 1, wherein the groove includes a base having longitudinal edges, a cross section of the longitudinal edges having a dovetail-like shape.

4. The insulating support according to claim 1, wherein the insulating upper face, at each side in a direction of the width, protrudes beyond a longitudinal edge of the groove by a distance greater than or equal to 45 mm.

5. The insulating support according to claim 1, further comprising at least one track fixing cell located below the single longitudinal groove.

6. The insulating support according to claim 5, wherein one of the at least one track fixing cells is a further supply conduit.

7. The insulating support according to claim 1, further comprising two longitudinal lateral flanges which are located on either side of the groove and a magnetic detection loop cable conduit located at a distance of at least 85 mm relative to the center plane extending through each flange.

8. The insulating support according to claim 7, wherein each flange includes a weight-reduction cell located at a same level as at least one track fixing cells.

9. The insulating support according to claim 1, further comprising a pair of external walls and at least one pair of internal walls which are inclined and parallel relative to the center plane, respectively, the two walls of each pair being symmetrical relative to the center plane and connecting the upper face to the lower face.

10. The insulating support according to claim 9, wherein the at least one pair of internal walls is a single pair of internal walls which connect the upper face to the lower face.

11. The insulating support according to claim 10, wherein the profile-member includes three separate elementary profile-member parts corresponding to three portions, respectively, a first portion comprising a first external wall and a first half of a first internal wall, a second central portion comprising a second half of the first internal wall and a first half of a second internal wall, a third portion comprising a second half of the second internal wall and a second external wall, the three elementary profile-member parts being fixed together side by side by a fixing device, the fixing device being an adhesive.

12. The insulating support according to claim 11, wherein the three separate elementary profile-member parts each have a same center of curvature and a different radius of curvature which increases as the elementary profile-member part is located further from the center of curvature.

13. The insulating support according to claim 11, wherein two separate elementary profile-member parts are assembled and fixed together and the third elementary profile-member part is a longitudinal insert, through which the at least one central conduit clamped between the two elementary profile-member parts extend.

14. The insulating support according to claim 1, being integral.

15. The insulating support according to claim 1, wherein the insulating material is a composite material of pultruded glass fibers.

16. An assembly of two insulating supports according to claim 1, further comprising a fishplate for connecting the two insulating supports, the fishplate including two lateral flanges extending longitudinally, and a cover with two lateral flanges extending longitudinally and having a predetermined thickness, each lateral flange including an inner face which corresponds, at both longitudinal ends thereof, to the outer shape of the two external walls located at the same side of the two supports.

17. The assembly of two insulating supports according to claim 16, wherein the thickness of the cover is slightly greater than the depth of the groove, and the lateral flanges each include a support rib of the cover arranged on the associated inner face so as to each be located at the same level as the base of the groove when the lateral flanges are assembled with the external walls of the two insulating supports.

18. The assembly of two insulating supports according to claim 16 further comprising a clamping device clamping the lateral flanges around the insulating supports.

19. The insulating support according to claim 1, wherein the ground transport system is of a tramway type.

20. A method for producing an insulating support for a ground electrical power supply track for a ground transport system, comprising the steps of: drawing, by means of glass fiber pultrusion, at least two elementary profile-member parts over a predetermined length, each elementary profile-member part corresponding to a longitudinal portion of a support profile-member of insulating material, the support profile-member including a substantially planar upper face to receive elements of the electrical power supply track and a planar lower face supported on the ground, the profile-member being provided with a longitudinal central groove arranged on the upper face in order to receive a conductive track element, and being provided with a web connecting the upper face to the lower face and through which one longitudinal conduit extends to receive an electrical power supply line of the high-voltage network, there being only one groove, the groove and supply conduit being arranged in a symmetrical manner about a longitudinal center plane which is perpendicular relative to the upper face; arranging the elementary profile-member parts side by side; adhesively-bonding longitudinal surfaces of each corresponding elementary profile-member part; bending, with the elementary profile-member being assembled, by pretensioning over a preforming die in accordance with a radius of curvature centered about a predetermined mean value, the radius of curvature varying increasingly in accordance with the position of the elementary profile-member relative to a center of curvature; taking the two ends of the insulating support and placing the ends of each elementary profile at the same level; and clamping the elementary profile-members using tie-rods which form safety elements in the event that the elementary profile-members become separated.

* * * * *